June 12, 1951  E. W. MERVINE  2,556,929
ASSEMBLY AND REPAIR RACK FOR WHEELED VEHICLES
Filed Aug. 24, 1948  2 Sheets-Sheet 2
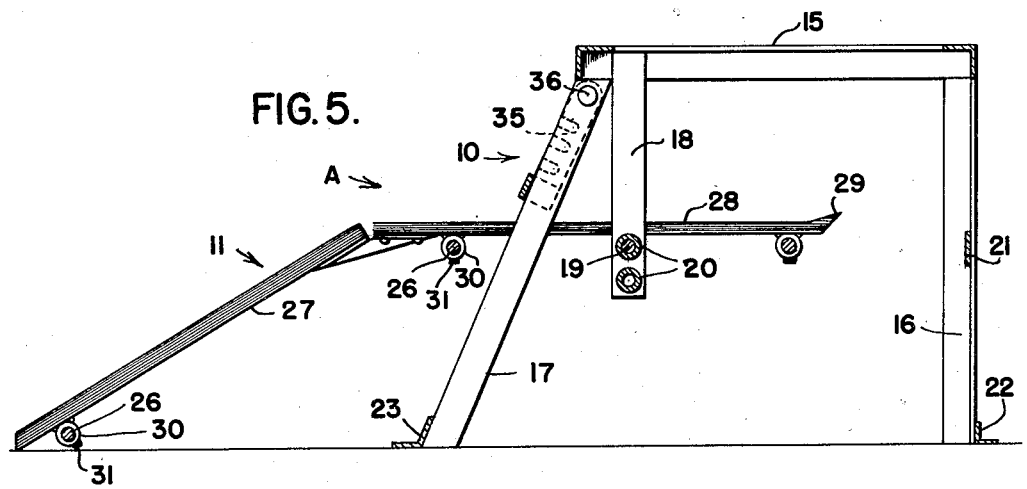
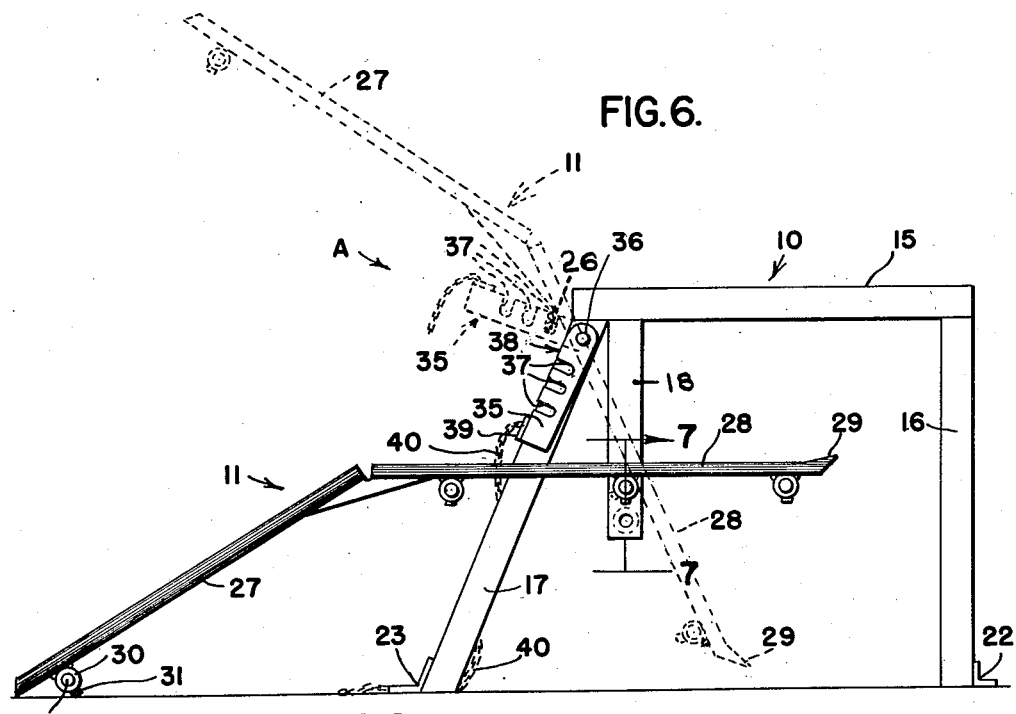
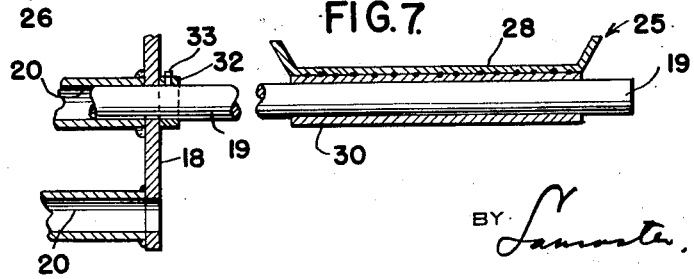
INVENTOR.
Elmer W. Mervine
BY
ATTORNEYS.

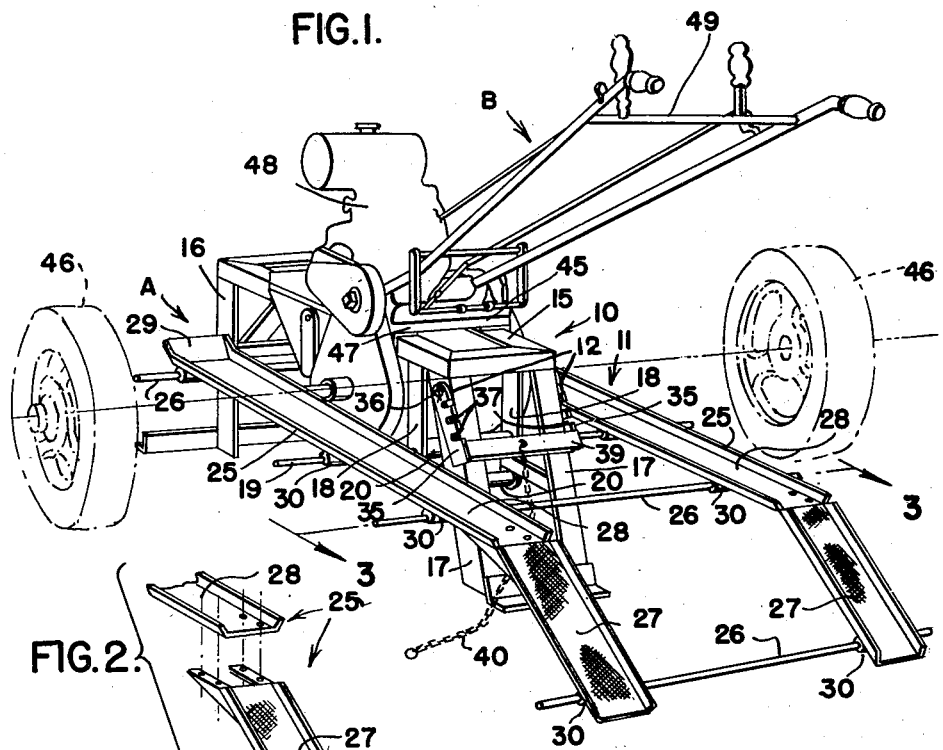

Patented June 12, 1951

2,556,929

UNITED STATES PATENT OFFICE 2,556,929

ASSEMBLY AND REPAIR RACK FOR WHEELED VEHICLES

Elmer W. Mervine, Annandale, Va.

Application August 24, 1948, Serial No. 45,857

5 Claims. (Cl. 254—88)

1

This invention relates to work holders and more specifically to assembly and/or repair racks or supports for wheeled vehicles such as garden tractors.

An important object of the invention is to provide a rack upon which a wheeled vehicle may be rolled, portions of the rack tilted so that the weight of the vehicle will be transferred from the wheels to the rack and the wheels retained clear of the rack, whereupon the wheels (or one of them) may be readily removed, replaced or the like.

Another important object is to provide a rack which may be employed as just described or may be employed in assembling a wheeled vehicle, section by section upon the rack and, after mounting the wheels, by tilting portions of the rack, the weight of the vehicle will be transferred from the rack to the wheels and the vehicle may be rolled from the rack.

A further important object is to provide such a rack or support including a fixed portion and a rocking portion so disposed that the weight of the vehicle may be readily transferred from one or the other.

In addition, a major object is to provide a rack or support as described, and including a track which, after the vehicle has been rolled therealong and supported for subsequent operations, may be disposed out of the way so as not to interfere with subsequent operations.

Still another major object is to provide a rack for wheeled vehicles, which rack may be adjusted to accommodate vehicles of various wheel bases, wheel sizes and the like.

A further major object is to provide a sturdy rack which contains no gears, ratchets, springs or similar parts apt to break under stress.

Other objects and advantages of the invention will be apparent during the course of the following detailed description of the invention, taken in connection with the accompanying drawings forming a part of this disclosure and in which drawings:

Fig. 1 is a perspective view of the novel rack or support in a position to receive a wheeled vehicle or in a position just prior to the mounting of wheels upon an assembled wheeled vehicle carried by the rack.

Fig. 2 is an elevation of two disassembled track sections forming part of the rack.

Fig. 3 is a transverse section (enlarged) substantially on the line 3—3 of Fig. 1.

Fig. 4 is a fragmentary longitudinal section substantially on the line 4—4 of Fig. 3.

2

Fig. 5 is a view mostly in longitudinal section of the rack as in Fig. 1.

Fig. 6 is a view mostly in side elevation of the same.

Fig. 7 is a transverse section of a portion of the rack, substantially on the line 7—7 of Fig. 6.

In the drawings, wherein for the purpose of illustration is shown a preferred embodiment of the invention and wherein similar reference characters designate corresponding parts thruout the several views, the letter A designates the novel rack or support and B a wheeled vehicle.

The rack or support A comprises a fixed or stationary portion 10 and movable or rocking portion 11 with means 12 to retain the angular position of the portion 11 with respect to the portion 10.

The fixed portion 10 constitutes the vehicle-supporting means for supporting the vehicle upon the rack when the vehicle is not supported upon its wheels, and includes a horizontally-disposed platform 15, supported by means such as a pair of forward, vertically-extending legs 16 and a pair of rearward legs 17 which incline rearwardly and, in effect, provide brace means as well.

Depending from the platform 15, preferably adjacent the juncture of the inclined legs 17 and platform 15, are a pair of brackets 18 having a plurality of pairs of axially-aligning perforations receiving the intermediate portion of a shaft 19 extending transversely of the rack and this portion may be carried by either one of several tubular bearings 20 supported by the brackets 18. These bearings 20 are arranged one above another as in Figs. 5 and 7, and may be welded to the brackets 18.

Suitable brace means 21 may be provided for the legs 16 and brace means 23 for the legs 17.

The movable or rocking portion 11 constitutes track and transfer means for the vehicle and includes a pair of tracks 25 adjustably mounted upon ties 26 pivotally supported by the shaft 19, and extending longitudinally of the rack A.

Each track 25 preferably comprises a rearward upwardly inclined minor section 27 which may be secured (as by riveting) to a normally substantially horizontal, elongated, major section 28 ending in an upturned front end, forming a wheel stop 29. The preferred transverse cross section of each track is shown in Fig. 3 and is somewhat channel-shaped. In the example shown, each track 25 has three ties 26 and one tie which is the shaft 19. These may be stout rods and the tracks are releasably secured thereto by any approved means such as sleeves 30 welded or otherwise firmly secured to the under sides of the tracks, in spaced apart relationship, with the axis of one sleeve 30 of one track aligning with the axis of an opposite sleeve. Set screws 31 extending thru the sleeves 30 bear against the ties 26. This permits adjustment of the tracks 25 along the ties 26 to take care of vehicles having various wheel bases.

In addition to these adjustments, by inserting the shaft 19 into a selected bearing 20, there is obtained another adjustment to take care of wheels of various diameters.

To prevent longitudinal shifting of the shaft 19 and yet permit removal of the shaft, there may be provided collars 32 encircling the shaft, and abutting the outer faces of the brackets and held in position by set screws 33 or the like.

The means 12 to retain the angular position of the portion 11 with respect to the portion 10, is shown to comprise a pair of arms 35 each pivoted as at 36 at one end portion to the legs 17 preferably closely adjacent their juncture with the platform 15, whereby they may be swung upwardly, as in dotted lines in Fig. 6. Each arm 35 is provided with a plurality of parallel, spaced-apart recesses 37 extending inwardly from their rearward faces 38. These recesses are adapted to receive one of the ties 26 when the portion 11 is tipped as shown in dotted lines in Fig. 6. The arms 35 need not be held in their adjusted positions by any abutments, stops or the like, since the pivotal axis of the portion 11 is spaced from this tie 26 a distance considerably greater than is the pivotal axes of the arms 35. The two arms 35 may be connected by a cross member 39. From the cross member a suitable member, as a flexible member or chain 40 may extend, to be grasped by the operator in order to swing the arms 35 upwardly or to detach the arms 35 from the shaft 19 when portions of the latter are within the recesses 38.

There is shown a wheeled vehicle B by way of illustration, including a chassis 45 mounted upon two removable wheels 46. The chassis has a normally horizontally-disposed frame portion 47 mounting the engine 48 and to the frame portion 47 are operatively connected handle bars 49 which extend rearwardly and upwardly of the frame portion 47.

In use, with the novel rack A disposed as in Fig. 1, the vehicle B may be rolled thereon, since the bottom face of the chassis frame portion 47 will then clear the upper face or surface of the platform 15, and as the wheels 41 roll over the axis of the shaft 19, the rocking portion 11 will automatically tip to a position, such as shown in dotted lines in Fig. 6. Three major things will happen: (1) the chassis frame portion 47 will come to rest upon the horizontal platform 15; (2) the tracks 25 will drop away from (clear) the wheels 46; and (3) the handle bars 49 will be contacted by the track sections 27. Consequently, the weight of the vehicle is now upon the fixed portion 10 and the chassis cannot slip off the rack, the wheels are free to be removed, adjusted or the like, and the tracks are held against further pivotal movement in one direction by the handle bars.

When the operator grasps the free end portion of the chain 40 and draws upwardly thereon, the arms 35 will rise on their pivots until the shaft 19 enters one of the recesses 38 of each arm, and the rocking portion 11 is releasably held against swinging movement in either direction. The wheels may now be readily removed and replaced.

Upon releasing the arms 35 from the shaft, and giving a slight push downwardly upon the tracks (as upon the section 27), the rocking portion will move to a position near to its position in Fig. 1. Thereupon, by placing the operator's weight upon a track section 27, the track section 28 will take its horizontal position and cause the replaced wheels to raise the chassis 45 free of the horizontal platform 15 so that the vehicle B may be rolled from the rack A. All that is required in either case is that the bottom face or surface of the chassis frame portion 47 slightly clear the upper face or surface of the platform 15 while the vehicle is being rolled on or off the rack. That is, the shortest distance between the horizontal planes of that portion of the periphery of a vehicle wheel in contact with the wheel-receiving surface of the track section 28 and the upper face or surface of the vehicle chassis supporting surface of the platform 15 be slightly less than the horizontal planes of that portion of the wheel periphery receiving face or surface and the bottom face of the chassis frame portion 47.

Various changes may be made to the form of the invention herein shown and described without departing from the spirit of the invention or scope of the claims.

What is claimed is:

1. In a wheeled vehicle assembly and repair rack for a vehicle having a substantially horizontal chassis frame portion, said rack including an upstanding stationary portion, having a substantially horizontal vehicle chassis-supporting surface; a rocking portion, including a pair of tracks, each having an elongated major section with a vehicle wheel periphery-receiving surface over which the wheel of the vehicle roll, spaced-apart ties for said tracks and means detachably securing said ties to said tracks including sleeves carried by the underside of said tracks with said ties slidable therein and set screws carried by said sleeves and bearing against said ties; and means pivoting said tracks to said stationary portion intermediate the ends of said tracks below said supporting surface, including a shaft carried by said stationary portion and extending to the underside of each track; the shortest distance between the horizontal planes of said surfaces being slightly less than the shortest distance between the horizontal planes of that portion of a wheel periphery contacting said wheel periphery-receiving surface and the bottom face of said chassis frame portion, said shaft providing an additional tie.

2. In a wheeled vehicle assembly and repair rack for a vehicle having a substantially horizontal chassis frame portion and handle bars operatively connected with said portion, said rack including an upstanding stationary portion, having a substantially horizontal, vehicle chassis-supporting surface; a rocking portion including a pair of spaced-apart tracks, each having an elongated normally horizontal major section and an inclined minor section, extending upwardly to the major section, each section having a vehicle wheel periphery-receiving surface over which the wheels of the vehicle roll; and means pivoting said rocking portion to said stationary portion and disposed intermediate the ends of said tracks with portions of said handle bars disposed within the upward pivotal path of travel of said minor track sections; the shortest distance between the horizontal planes of said surfaces being slightly less than the shortest distance between the horizontal planes of that portion of a wheel periphery contacting said wheel periphery-receiving surface and the bottom face of said chassis frame portion, and the lengths of said tracks being such that when said rocking portion is rocked to one position with said chassis frame portion upon said chassis frame portion supporting surface, said minor track sections will contact portions of said handle bars.

3. In a wheeled vehicle assembly and repair rack for a vehicle having a substantially horizontal chassis frame portion and handle bars operatively connected with said portion, said rack including an upstanding stationary portion, having a substantially horizontal, vehicle chassis-supporting surface; a rocking portion including a pair of spaced-apart tracks, joined together by a rod, each rocking portion having an elongated normally horizontal major section and an inclined minor section, extending upwardly to the major section, each section having a vehicle wheel periphery-receiving surface over which the wheels of the vehicle roll; means pivoting said rocking portion to said stationary portion and disposed horizontally intermediate the ends of said tracks with portions of said handle bars disposed within the upward path of travel of said minor track sections; the shortest distance between the horizontal planes of said surfaces being slightly less than the shortest distance between the horizontal planes of that portion of a wheel periphery contacting said wheel periphery-receiving surface and the bottom face of said chassis frame portion, and the lengths of said tracks being such that when said rocking portion is rocked to one position with said chassis frame portion upon said chassis frame portion supporting surface, said minor track sections will contact said handle bars; and means cooperating with said tie rod to releasably retain said rocking portion in said handle bars-contacting position.

4. In a wheeled vehicle assembly and repair rack for a vehicle having a substantially horizontal chassis frame portion and handle bars operatively connected with said portion, said rack including an upstanding stationary portion, having a substantially horizontal, vehicle chassis-supporting surface; a rocking portion including a pair of spaced-apart tracks, each having an elongated normally horizontal major section and an inclined minor section, extending upwardly to the first section, each section having a vehicle wheel periphery-receiving surface over which the wheels of the vehicle roll, said rocking section also including a tie joining said tracks; means pivoting said rocking portion to said stationary portion and disposed intermediate the ends of said tracks; the shortest distance between the horizontal planes of said surfaces being slightly less than the shortest distance between the horizontal planes of that portion of a wheel periphery contacting said wheel periphery-receiving surface and the bottom face of said chassis frame portion, and the lengths of said tracks being such that when said rocking portion is rocked to one position with said chassis frame portion upon said chassis frame portion supporting surface, said minor track sections will contact said handle bars; and means to releasably retain said rocking portion in said handle bars-contacting position, including a pair of arms pivotally carried by said stationary portion and provided with spaced-apart recesses constructed and arranged to receive portions of one of said ties, the distance of the axis of rotation of either of said arms to the farthest recess being less than the distance between the axis of rotation of said rocking portion and the axis of said tie.

5. In a wheeled vehicle assembly and repair rack for a vehicle having a substantially horizontal chassis frame portion and handle bars operatively connected with said portion, said rack including an upstanding stationary portion, having a substantially horizontal, vehicle chassis-supporting surface; a rocking portion including a pair of spaced-apart tracks, each having an elongated normally horizontal major section and an inclined minor section, extending upwardly to the first section, each section having a vehicle wheel periphery-receiving surface over which the wheels of the vehicle roll, said rocking section also including a tie joining said tracks; means pivoting said rocking portion to said stationary portion and disposed intermediate the ends of said tracks; the shortest distance between the horizontal planes of said surfaces being slightly less than the shortest distance between the horizontal planes of that portion of a wheel periphery contacting said wheel periphery-receiving surface and the bottom face of said chassis frame portion, and the lengths of said tracks being such that when said rocking portion is rocked to one position with said chassis frame portion upon said chassis frame portion supporting surface, said minor track sections will contact said handle bars; and means to releasably retain said rocking portion in said handle bars-contacting position, including a pair of arms pivotally carried by said stationary portion, closely adjacent said vehicle chassis-supporting surface, and provided with spaced-apart recesses constructed and arranged to receive portions of one of said ties, the distance of the axis of rotation of either of said arms to the farthest recess being less than the distance between the axis of rotation of said rocking portion and the axis of said tie.

ELMER W. MERVINE.

REFERENCES CITED

The following references are of record in the file of this patent:

UNITED STATES PATENTS

| Number | Name | Date |
|---|---|---|
| 1,897,053 | Houge | Feb. 14, 1933 |
| 1,961,873 | Edmonds | June 5, 1934 |

FOREIGN PATENTS

| Number | Country | Date |
|---|---|---|
| 566,545 | Germany | Dec. 17, 1932 |